United States Patent
Mishra et al.

(10) Patent No.: US 11,031,809 B2
(45) Date of Patent: *Jun. 8, 2021

(54) SYSTEM AND METHOD FOR EMERGENCY LIGHTING

(71) Applicant: SIGNIFY HOLDING B.V., Eindhoven (NL)

(72) Inventors: Priya Ranjan Mishra, Eindhoven (NL); Rakeshbabu Panguloori, Eindhoven (NL); Venkata Sriram Pullela, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,603

(22) Filed: Dec. 16, 2019

(65) Prior Publication Data

US 2020/0119583 A1    Apr. 16, 2020

Related U.S. Application Data

(63) Continuation of application No. 14/405,590, filed as application No. PCT/IB2013/053924 on May 14, 2013, now Pat. No. 10,547,205.

(60) Provisional application No. 61/656,674, filed on Jun. 7, 2012.

(51) Int. Cl.
| | |
|---|---|
| *H02J 9/06* | (2006.01) |
| *H02J 9/02* | (2006.01) |
| *H05B 47/11* | (2020.01) |
| *H05B 47/105* | (2020.01) |
| *H05B 47/185* | (2020.01) |

(52) U.S. Cl.
CPC ............. *H02J 9/065* (2013.01); *H02J 9/02* (2013.01); *H05B 47/105* (2020.01); *H05B 47/11* (2020.01); *H05B 47/185* (2020.01)

(58) Field of Classification Search
CPC ................................ H02J 9/065; H05B 47/11
See application file for complete search history.

(56) References Cited

U.S. PATENT DOCUMENTS

| | | | |
|---|---|---|---|
| 5,148,158 A | 9/1992 | Shah | |
| 5,208,584 A * | 5/1993 | Kaye | G08G 1/07 340/478 |
| 5,574,423 A | 11/1996 | Vosika et al. | |
| 5,917,250 A | 6/1999 | Kakalec et al. | |
| 6,510,995 B2 | 1/2003 | Muthu et al. | |
| 6,583,719 B2 | 6/2003 | Okada et al. | |
| 6,867,558 B2 * | 3/2005 | Gaus, Jr. | H05B 47/185 315/314 |

(Continued)

FOREIGN PATENT DOCUMENTS

| | | |
|---|---|---|
| CN | 2133088 Y | 5/1993 |
| CN | 1860830 A | 11/2006 |

(Continued)

*Primary Examiner* — Daniel Kessie
(74) *Attorney, Agent, or Firm* — Daniel J. Piotrowski

(57) ABSTRACT

A lighting network (100) and methods therefore are disclosed. The lighting network (100) a plurality of lighting units (10) that can operate on AC power and DC back up power if the AC power is removed. A controller (15) is used to redistribute the DC power between the plurality of lighting units (10) in the event that DC power is low or exhausted in one of the plurality of lighting units (10).

11 Claims, 5 Drawing Sheets

(56) References Cited

U.S. PATENT DOCUMENTS

| | | | | |
|---|---|---|---|---|
| 6,933,627 | B2 * | 8/2005 | Wilhelm | H02J 1/06 |
| | | | | 307/66 |
| 7,026,768 | B1 * | 4/2006 | Ruiz | G08B 7/066 |
| | | | | 315/185 R |
| 7,233,115 | B2 * | 6/2007 | Lys | H02M 3/156 |
| | | | | 315/291 |
| 7,307,542 | B1 | 12/2007 | Chandler et al. | |
| 7,378,805 | B2 * | 5/2008 | Oh | H05B 45/37 |
| | | | | 315/291 |
| 7,385,831 | B2 * | 6/2008 | Ito | H05B 45/35 |
| | | | | 363/21.09 |
| 8,115,397 | B2 | 2/2012 | Jonsson | |
| 8,274,227 | B2 * | 9/2012 | Mangiaracina | H05B 41/28 |
| | | | | 315/86 |
| 8,299,712 | B2 | 10/2012 | Smith, III et al. | |
| 8,312,347 | B2 | 11/2012 | Hick et al. | |
| 8,384,312 | B2 * | 2/2013 | Tsai | H05B 47/185 |
| | | | | 315/312 |
| 8,587,217 | B2 * | 11/2013 | Melanson | H05B 45/48 |
| | | | | 315/294 |
| 8,629,618 | B1 * | 1/2014 | Tanner | H05B 45/00 |
| | | | | 315/86 |
| 8,686,662 | B1 * | 4/2014 | Bragg | H02J 7/345 |
| | | | | 315/291 |
| 8,764,242 | B2 | 7/2014 | Recker et al. | |
| 8,860,317 | B2 * | 10/2014 | Park | H05B 45/37 |
| | | | | 315/165 |
| 9,225,254 | B2 * | 12/2015 | Christoph | H05B 45/37 |
| 9,609,706 | B2 * | 3/2017 | Crenshaw | H05B 45/50 |
| 2001/0000422 | A1 | 4/2001 | Sid | |
| 2002/0047627 | A1 * | 4/2002 | Pickering | H02J 9/065 |
| | | | | 315/291 |
| 2002/0074559 | A1 * | 6/2002 | Dowling | A61N 5/06 |
| | | | | 257/99 |
| 2002/0130627 | A1 * | 9/2002 | Morgan | F21V 31/00 |
| | | | | 315/291 |
| 2003/0178967 | A1 | 9/2003 | Khatri | |
| 2007/0236975 | A1 | 10/2007 | Lippojoki et al. | |
| 2008/0088241 | A1 * | 4/2008 | Chen | H05B 45/00 |
| | | | | 315/88 |
| 2008/0101078 | A1 | 5/2008 | Stokes | |
| 2008/0265799 | A1 * | 10/2008 | Sibert | H05B 47/175 |
| | | | | 315/292 |
| 2008/0303661 | A1 * | 12/2008 | Chick | G08B 13/19 |
| | | | | 340/541 |
| 2009/0154148 | A1 * | 6/2009 | Meyer | F21S 9/02 |
| | | | | 362/157 |
| 2010/0061076 | A1 | 3/2010 | Mandy et al. | |
| 2010/0231042 | A1 | 9/2010 | Weale | |
| 2010/0290207 | A1 | 11/2010 | Chan et al. | |
| 2011/0018441 | A1 * | 1/2011 | Tanaka | H05B 47/22 |
| | | | | 315/82 |
| 2011/0133649 | A1 | 6/2011 | Kreiner et al. | |
| 2011/0285526 | A1 * | 11/2011 | Tanaka | G01R 31/392 |
| | | | | 340/514 |
| 2011/0309747 | A1 * | 12/2011 | Michaud | H05B 47/16 |
| | | | | 315/86 |
| 2012/0026726 | A1 | 2/2012 | Recker et al. | |
| 2012/0057333 | A1 * | 3/2012 | Bhardwaj | F21L 13/06 |
| | | | | 362/183 |
| 2012/0133298 | A1 * | 5/2012 | Campbell | H05B 45/37 |
| | | | | 315/250 |
| 2012/0181934 | A1 | 7/2012 | Knibbe et al. | |
| 2012/0195032 | A1 * | 8/2012 | Shew | F21V 23/007 |
| | | | | 362/183 |
| 2012/0299480 | A1 * | 11/2012 | Peting | H05B 45/37 |
| | | | | 315/113 |
| 2013/0026924 | A1 * | 1/2013 | Jong | H05B 45/48 |
| | | | | 315/113 |
| 2013/0127362 | A1 | 5/2013 | Trainor et al. | |
| 2013/0154518 | A1 * | 6/2013 | Davies | H05B 45/50 |
| | | | | 315/309 |
| 2013/0169165 | A1 * | 7/2013 | Sadwick | H05B 47/10 |
| | | | | 315/152 |
| 2013/0241438 | A1 * | 9/2013 | Suzuki | H05B 47/10 |
| | | | | 315/295 |
| 2013/0249429 | A1 * | 9/2013 | Woytowitz | H05B 47/185 |
| | | | | 315/246 |
| 2013/0328402 | A1 * | 12/2013 | Noguchi | H05B 45/10 |
| | | | | 307/66 |
| 2014/0139019 | A1 * | 5/2014 | Whitfield | H05B 45/10 |
| | | | | 307/23 |
| 2014/0346966 | A1 * | 11/2014 | Wu | H05B 41/3924 |
| | | | | 315/201 |

FOREIGN PATENT DOCUMENTS

| | | | | |
|---|---|---|---|---|
| CN | 101776240 | A | 7/2010 | |
| CN | 102163873 | A | 8/2011 | |
| CN | 102265481 | A | 11/2011 | |
| DE | 19832550 | A1 | 2/2000 | |
| EP | 1411617 | A1 * | 4/2004 | H05B 47/29 |
| GB | 2422496 | A | 7/2006 | |
| JP | 2003068482 | A | 3/2003 | |
| JP | 2003068484 | A | 3/2003 | |
| JP | 2006174540 | A | 6/2006 | |
| WO | 2008124701 | A2 | 10/2008 | |
| WO | 2010043923 | A1 | 4/2010 | |
| WO | 2011015975 | A2 | 2/2011 | |
| WO | 2011080513 | A2 | 7/2011 | |
| WO | 2011086806 | A1 | 7/2011 | |

* cited by examiner

SYSTEM AND METHOD FOR EMERGENCY LIGHTING

CROSS-REFERENCE TO PRIOR APPLICATIONS

This application is a continuation application of U.S. patent application Ser. No. 14/405,590, filed on Dec. 4, 2014, which is a U.S. National Phase application under 35 U.S.C. § 371 of International Application No. PCT/IB2013/053924, filed on May 14, 2013, which claims the benefit of U.S. Patent Application No. 61/656,674, filed on Jun. 7, 2012. These applications are hereby incorporated by reference herein.

This invention relates to systems and methods for providing state-by lighting and, more particularly, a network based distributed plug-in emergency lamp system.

In many areas around the world, electric power provided by a utility company may be unreliable. In such areas, buildings are typically equipped with an emergency lighting system. The emergency lighting system generally consists of a single (battery backup) emergency lamp that is usually placed in the living room/hall of the house. Even though the conventional emergency lamp switches ON when a power outage occurs, such conventional emergency lighting systems provide little help if the occupants the house are not in the single room in which the emergency lamp is located. This also leads to energy waste when the occupants are not in the room in which the emergency lamp is located.

To illuminate another room, a fully/partially charged battery backup lamp must be used. This either leads to inconvenience or safety hazard in an emergency by having to find/move the battery backup lamp in the dark. To experience hassle free light backup, the user has to have multiple lamps with sufficient storage/battery life. This solution is costly.

Accordingly, a need exists in the art for systems and methods to address the shortcomings of the conventional emergency lighting systems described above.

One aspect of the present invention is related to a network based distributed plug-in emergency lamp solution that can provide light backup in multiple rooms or utility areas of the building. Unlike the conventional emergency lamps discussed above, the plug-in emergency lamp according to embodiments of the present invention can be used as normal lamp, has less storage and/or has intelligence to minimize the wastage of backup energy when the user is not around or when daylight is available. The network based distributed plug-in emergency lamps can connect a battery storage system that can be used by all the plug-in emergency lamps in the building during the power outage. Such a power sharing network helps to extend the light availability for limited period in the occupied places of building. In this way compact low cost lamps in different rooms can be combined together to give the user better performance.

In another aspect of the present invention, the power sharing network connects all the plug-in emergency lamps on existing AC wiring in the building during the power outage interval, identifies the available storage in each of the plug-in emergency lamps and adjusts the power resource by sending power from one plug-in emergency lamp to another to extend the light availability in the occupied spaces of building.

In another embodiment, the power sharing network connects all the plug-in emergency lamps with additional wiring to form a DC network, identifies the available storage in each of the plug-in emergency lamps and adjusts the power resource by sending power from one plug-in emergency lamp to another to extend the light availability in the occupied spaces of building for a predetermined time.

In another embodiment of the present invention, the proposed invention uses the additional wiring to exchange the power as well as data between the plug-in emergency lamps during the power outages and uses a simplified the control architecture.

In another embodiment of the present invention, an additional battery bank can be connected to the DC network to extend the light in one or more of the rooms, in case of the emergency or a planned activity. This may be done by reserving one node on DC network and connecting the additional battery bank to the (vacant) reserved node.

In other embodiments of present invention, various types of conventional emergency lamps can also be added and networked together with the plug-in emergency lamps.

In another embodiment of the invention, a grid power monitoring unit is used to communicate with all the plug-in emergency lamps to configure the network.

In one embodiment, the present invention is directed to a lighting network including a plurality of lighting units that can operate on AC power and DC power if the AC power is removed. A controller is arranged to redistribute the DC power between the plurality of lighting units. The lighting network also an AC power monitoring unit arranged to detect the presence or absence of the AC power. In the lighting network the controller redistributes the DC power using the same distribution path used by the AC power.

In another embodiment, the present invention is directed to a lighting unit including a lighting emitting unit, a driver coupled to the lighting emitting unit and an AC/DC converter arranged to supply power to the driver. A DC battery unit (14) is also coupled to the driver and arranged to supply power to the driver if the AC/DC converter cannot supply the power to the driver. A controller (15) arranged to request additional power if the power from the DC battery unit is running low. The lighting unit also includes a bypass switch that is used to switch, under control from the controller, to the DC power when the AC power is not available.

In yet another embodiment, the lighting unit further includes a DC input path to receive the additional power.

Another embodiment of the present invention is directed to a method for supplying DC back up lighting for an area. The method includes the steps of determining if an AC power outage has occurred and determining if the area was illuminated before the AC power outage occurred. Based upon the determinations, if the area was not illuminated the DC back up lighting is not supplied for the area and if the area was illuminated supply the DC back up lighting if the illumination was not daylight.

In a further embodiment of the present invention, an on-off switch of a dependable lighting unit is replaced by tactile switch. Whenever a user presses the tactile switch, power to the dependable lighting unit is momentarily cut OFF and the event is registered. Whenever, the event gets registered; the dependable lighting unit toggles from ON to OFF state or vice versa. If the loss of power is not momentary then the event is recognized as power outage condition.

In yet another embodiment of the present invention, a control circuit is used to differentiate between the tactile switch operation and momentarily mains voltage dip to avoid false triggering.

In general, the various aspects and embodiments of the present invention may be combined and coupled in any way possible within the scope of the invention. The subject matter that is regarded as the invention is particularly pointed out and distinctly claimed in the claims at the conclusion of the specification.

The foregoing and other features and advantages of the invention will be apparent from the following detailed description taken in conjunction with the accompanying drawings.

Figure 1:
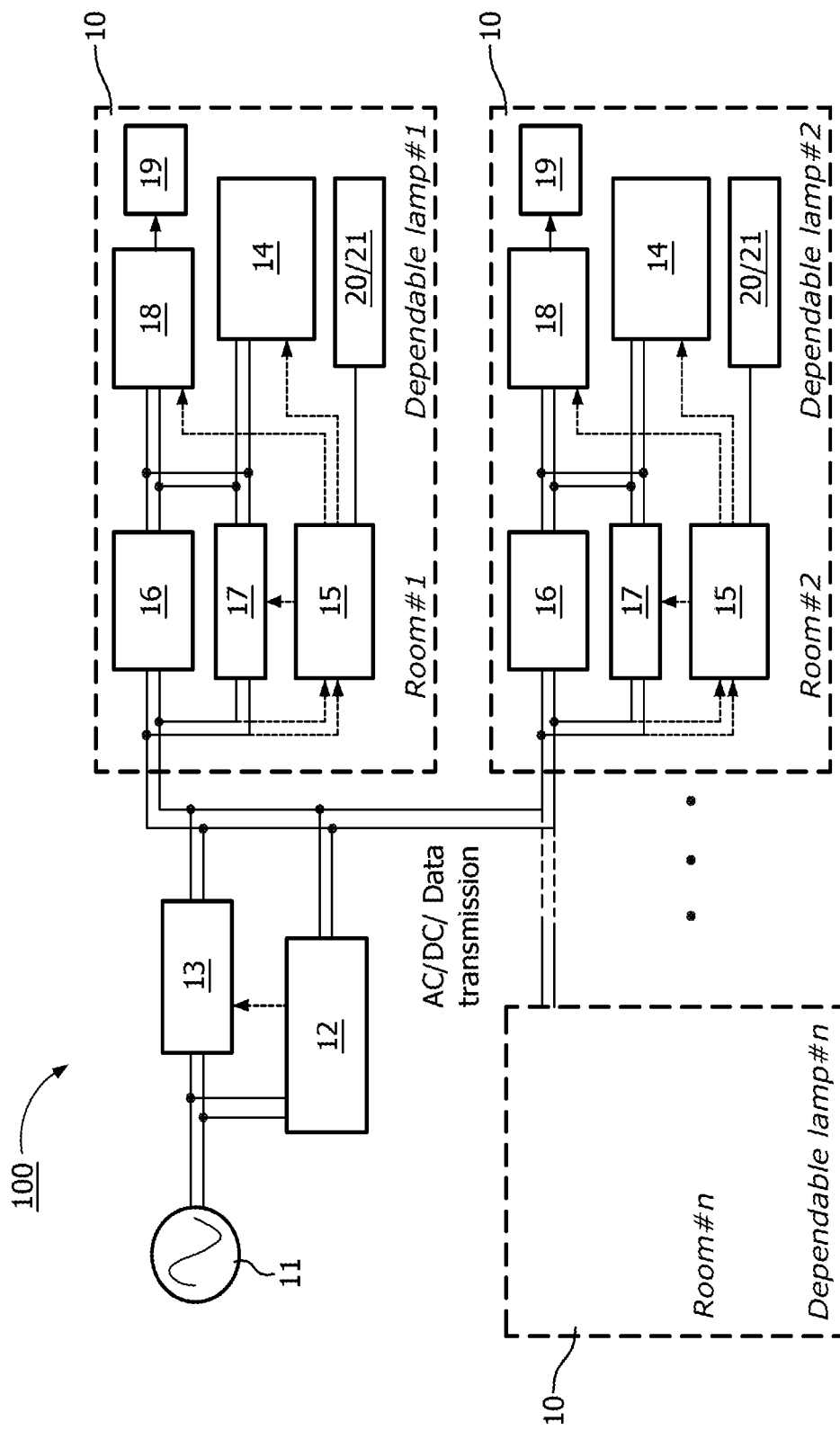
FIG. 1 shows a schematic of the power sharing network for the plug-in emergency lamps (or dependable lamps) according to an embodiment of the invention.

As shown in FIG. 1, a network 100 of dependable lamps 10 will work in a conventional mode in the presence of AC power supplied by AC mains 11. In the conventional mode, the dependable lamps 10 operate as conventional individual lamps. When the AC power is available, the dependable lamps 10 are in a battery charge or trickle charge mode. A control switch (not shown) may be used to switch the dependable lamp ON or OFF. The presence of the AC power (i.e., grid/main power) is monitored by a power monitoring unit 12. In absence of the AC power, the power monitoring unit 12 sends a signal to power isolator switch 13 to disconnect local distribution from the AC mains 11. In absence of the AC power, all the dependable lamps 10 in the network 100 switch to form DC network for DATA/power transfer. When the AC power is restored, the power monitoring unit 12 sends another signal to all the dependable lamps 10 to switch to the AC power.

The network 100 is disconnected from the AC mains 11 through the power isolator switch 13 and each of the dependable lamps 10 is be powered by a charge management/battery unit 14. It is noted that the charge management/battery unit 14 may be two separate components.

In the event that a particular one or more of the dependable lamps 10 needs to provide light beyond specified limited period (e.g., some set time or the capacity of the battery 14), a user can trigger the particular lamp via a remote device or press switch or touch sensor (not shown). The network 100 may also include a proximity sensor 20 and/or a daylight sensor 21 to optimize the power resource to extend the light availability. The sensors 20/21 may also be included as part of a lighting driver 18. According, instead or in addition to the trigger from the user, the dependable lamp 10 can automatically sense the user and turn on and, if needed, obtain additional power as described below.

If the particular lamp 10 has a completely discharged battery 14 then the particular lamp 10 will search for power availability on the network 100 by sending a power dry up signal to one or more of the other dependable lamps 10 in the network 100. This is done by a communication controller 15.

The choice of communication may be PLC or any other conventional means. PLC stands for power line communication or power line carrier (PLC), also known as power line digital subscriber line (PDSL), mains communication, power line telecom (PLT), power line networking (PLN), or broadband over power lines (BPL) and are systems for carrying data on a conductor also used for electric power transmission.

The dependable lamps 10 that receive the power dry up signal and which have enough stored power in their own batteries 14 will send back a signal to the dependable lamp 10 which originated the power dry up signal request. Each of the dependable lamps 10 has a unique identifiable code that can be addressed. Once protocol hand shaking between the two or more dependable lamps 10 is complete the dependable lamp 10 which has stored energy will allow the access to its battery 14 to the dependable lamp 10 which originated the power dry up signal request.

To enable the power from the battery 14 to pass from one of the dependable lamps 10 to another on the network 100, AC/DC converters 16 on both the dependable lamps 10 are bypassed using bypass switches 17. The bypass switches 17 remain connected for a predetermined time or may be controlled by the dependable lamp 10 which originated the dry up signal request (i.e., the sender lamp 10).

Before connecting power to the lighting driver 18 of a lighting unit 19, the communication controller 15 of the sender lamp 10 will ensure that light is not being generated the lighting unit 19. The lighting unit 19 may be a LED unit or other lighting producing unit. The communication controller 15 will also control the charge management/battery unit 14 so as not to charge the sender lamp 10's battery 14 and to use the power received only to power the lighting unit 19 via the lighting driver 18. The other dependable lamps 10 in the network 100 will be either isolated or in high impedance mode. In this manner, the network 100 functions in a seamless manner to make the light available to the user for a predetermined time.

Once the AC power is restored, the network 100 will monitor and reconnect the dependable lamps 10 in the network 100 to the AC mains 11.

Figure 2:
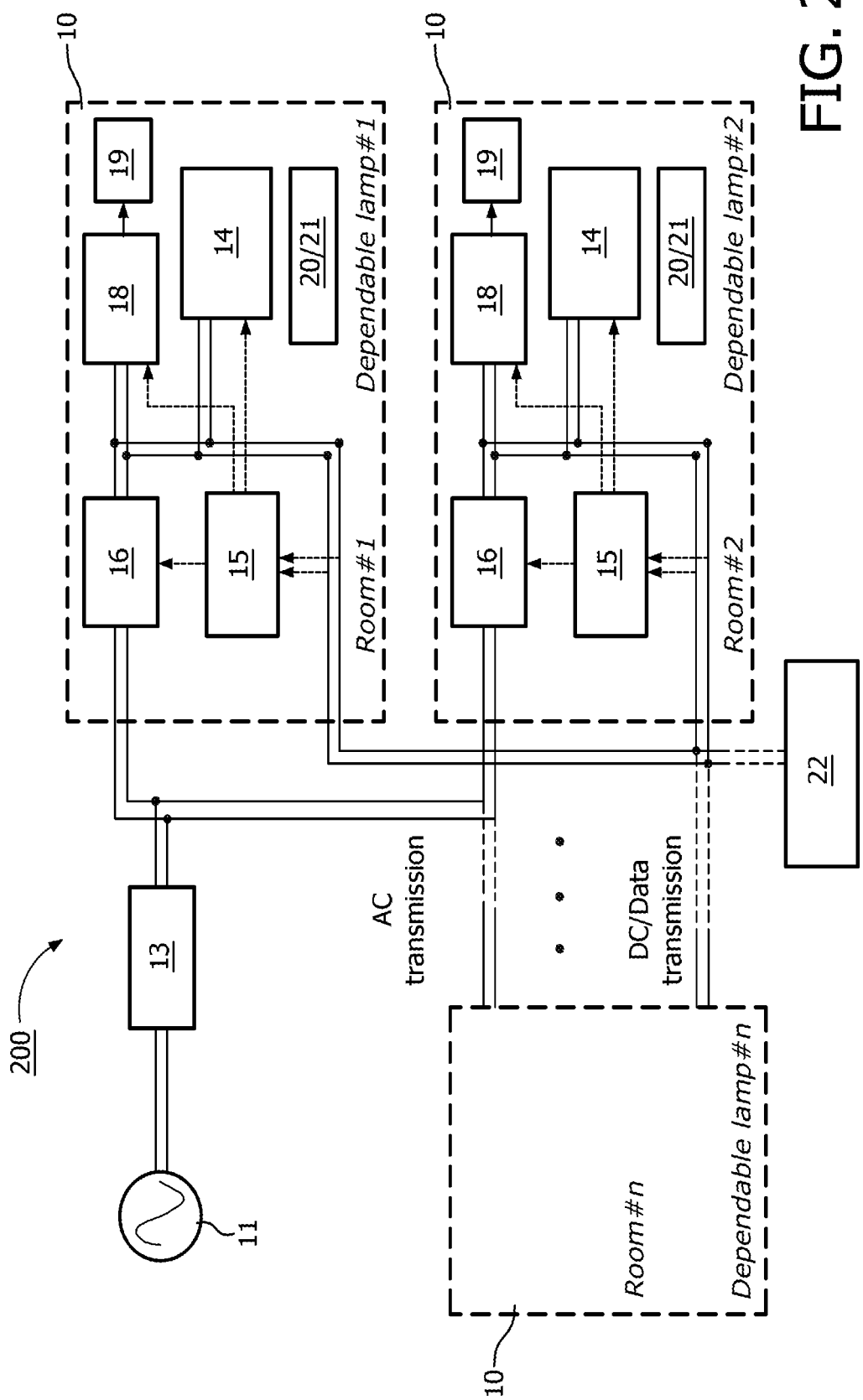
FIG. 2 shows a schematic of the power sharing network for the plug-in emergency lamps (or dependable lamps) according to another embodiment of the invention.

FIG. 2 shows another embodiment of a power sharing network 200 for plug-in emergency lamps. The same reference numbers are used for elements that are the same or similar to those shown in FIG. 1. As shown in FIG. 2, separate wiring is used to share battery power between the dependable lamps 10 as well as from a master storage unit 22. The separate wiring is also used to allow the dependable lamps 10 to communicate with each other. When the AC power is available, each of the dependable lamps works independently as a conventional lamp with AC grid power.

In the event of an AC grid power outage, the dependable lamps 10 can sense the presence of the user in the room and turned ON from the power associated with the battery 14. When the battery 14 associated with the individual dependable lamp 10 is used up the charge management system 14 will search for power availability on the DC network by sending the power dry up signal to each of the other dependable lamps 10 in the network 200. This request and reply procedure is similar to the protocol described in regard to the embodiment shown in FIG. 1. Serial switches in the charge management unit 14 in the dependable lamps 10 are used to form the low impedance network for power flow from one of dependable lamps 10 to another. The network 200 may also include the presence/daylight sensors 20/21 to optimize the power resource to extend the light availability.

In another embodiment, the networks 100 and/or 200 may include "snap shot" feature to memorize a state of the room at the instant of the AC power outage. The dependable lamps 10 will switch on only when the room was in an illuminated state before the AC power outage occurred. Otherwise the dependable lamp 10 will not turn on automatically in the event of the AC power outage if the room was in non-illuminated state. The daylight sensor 21 is used to sense the illumination condition of surroundings at the instant of the AC power outage. The daylight sensor 21 should be able to differentiate between day light and artificial light so that it should not switch on during day.

It should be understood that the "snap shot" feature described herein may be used with other types of emergency lamps and is not limited to use with only networked dependable lamps 10.

Figure 3:
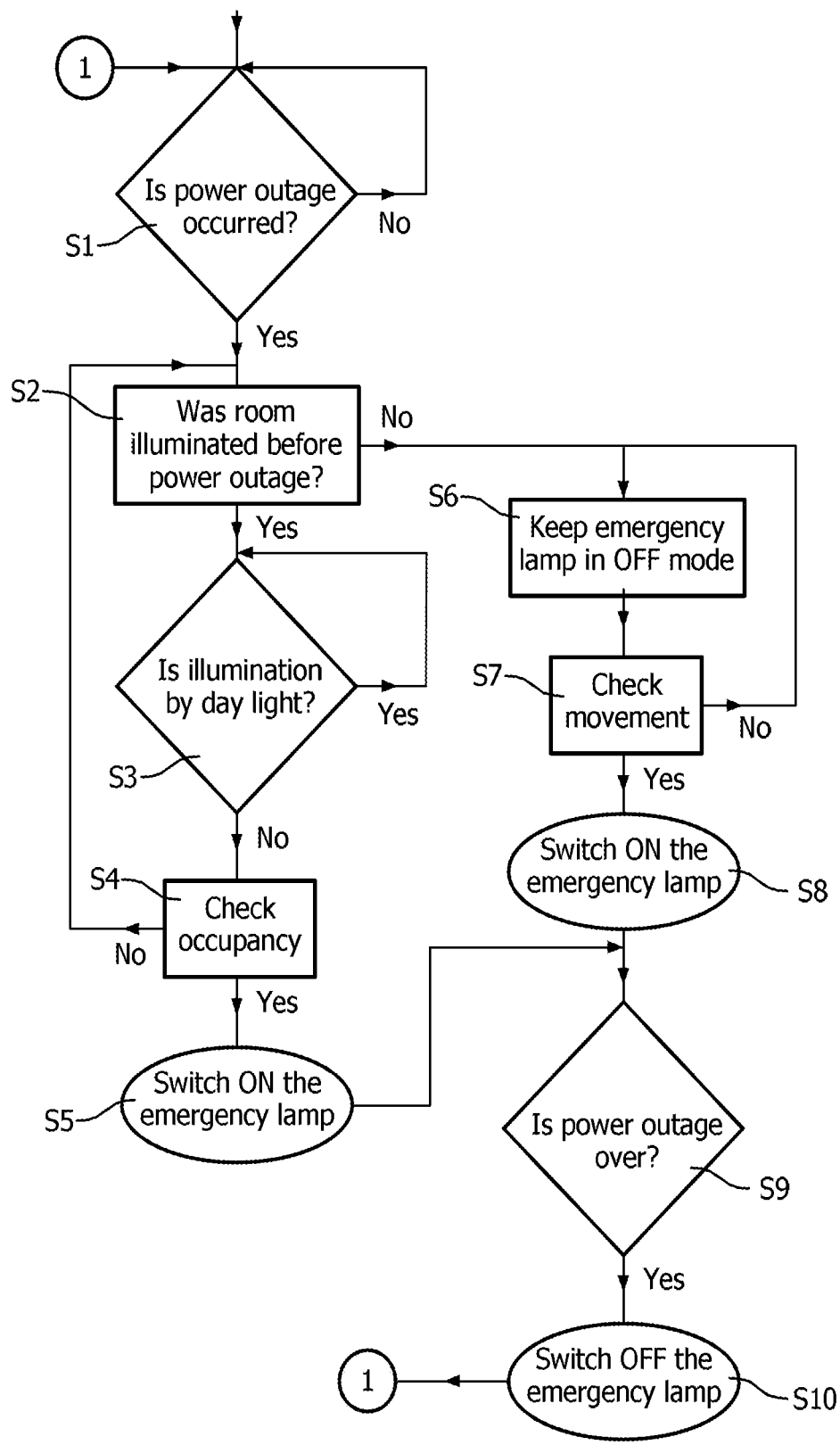
FIG. 3 shows an emergency lamp "snap shoot" method according to another embodiment of the present invention.

A method for the snap shot feature to enable switching on/off of the dependable lamps 10 based on room lighting condition is shown in FIG. 3. The method can be embodied as an algorithm or computer readable code that is accessible or embedded in one of the components (e.g., the communication controller 15) of the dependable lamp 10. The component, for example, can be a microcontroller, ASIC or ROM.

In step S1 of FIG. 3, it is determined if the AC power outage has occurred. In step S2, it is checked if the room was illuminated at the time of the AC power outage. In step S3, it is determined if the illumination was day light. In step S4, it is checked if the room is currently occupied. In step S5, the dependable lamp 10 is turned on. In step S6, the dependable lamp 10 is maintained in the off state. In step S7, it is checked if there is movement in the room. In step S8, the dependable lamp is turned on. In step S9, it is determined if the AC power as been restored. In step S10, the dependable lamp 10 is turned off.

It should be understood by one of ordinary skill in the art that the flow of the method shown in FIG. 3 can be adjusted to cover various permutations of turning the dependable lamp 10 on/off based upon the signals from the presence sensor 20 and the day light sensor 21 as well as restoration of the AC power.

In another embodiment, the presence sensor 20 should be able to distinguish between the presence and the movement of the user so that whenever the presence senor 20 senses the movement in the room, the dependable lamp 10 is switched on even if the snap shot is dark at the time of the AC power outage. The presence sensor 20 takes control once the presence sensor 20 detects the movement in the room and switches off or on the dependable lamp 10 based on the movement detection.

In another embodiment, the dependable lamp 10 may also include an indicator to display various state conditions. For example, the indicator can show the user that the dependable lamp 10 has sensed the dark condition at the time of the AC power outage and kept the lamp in off condition, e.g., the user may be asleep in the room.

In another embodiment, to extend availability of light in one or more of the rooms, one node of the network 200 may be kept vacant intentionally. Whenever a charged battery is connected to the vacant node, the vacant node will communicate with the master storage unit 22 which will make the sharing power from the vacant node to the requester dependable lamp 10.

In another embodiment, the dependable lamps 10 may have variable light level outputs to reduce/extend the power backup time. Such dimming may be varied based on a predetermine time or a predetermined battery threshold level.

In a further embodiment of the present invention, a conventional on-off switch for controlling the dependable lamps 10 is replaced by a tactile switch 30. Whenever a user presses the tactile switch 30, power to the dependable lamp 10 momentarily cuts OFF and such event is registered. Whenever the event gets registered; the dependable lamp 10 toggles from ON to OFF state or vice versa. This means if the dependable lamp 10 is ON condition it shifts to OFF condition or vice versa. If the dependable lamp 10 determines that a loss of grid power is beyond a predetermined threshold limit then the event is recognizes as a power outage condition and lighting battery backup function is initiated.

Figure 4:
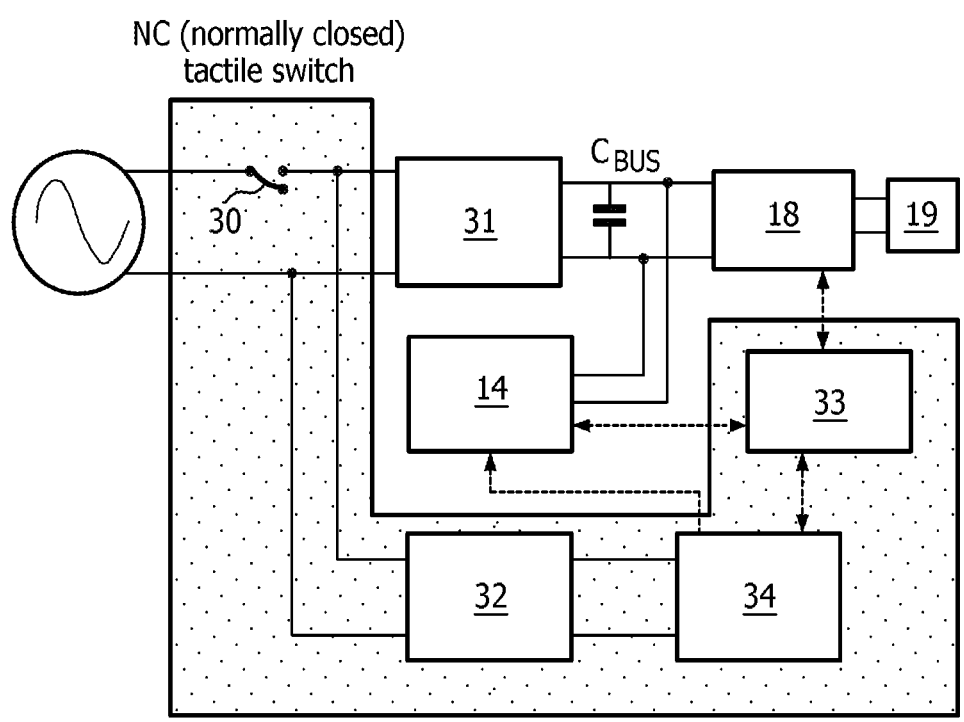
FIG. 4 shows a schematic of a tactile switch feature for the plug-in emergency lamp according to another embodiment of the invention.

FIG. 4 shows a schematic of the dependable lamp 10 including the tactile switch 30 (normally closed). In this embodiment, the dependable lamp 10 includes two full bridge rectifiers (31 and 32), the lamp driver 18, the charge management unit 14, a lamp state monitoring unit 33 and a mains voltage monitoring unit 34. The output of the full bridge rectifier 32 is not filtered and is monitored by the mains monitoring unit 33 (e.g., via a voltage divider). The mains voltage monitoring unit 33 includes a mains voltage slope measurement subunit and an outage determination subunit (not separately shown in FIG. 4). These subunits can be either hardware components or ASIC (Application Specific Integrated Circuit) or embedded software or combinations thereof. As shown by the dashed lines in FIG. 4, the various functional blocks communicate among themselves. It should also be understood that the functional blocks shown in FIG. 4 may be embedded in one controller or multiple controllers.

The tactile switch 30 (e.g., normally closed (NC) single pole) is used to control the dependable lamp 10. Whenever the tactile switch 30 is pressed the mains supply is disrupted and this event is sensed by mains voltage monitoring unit 33 through the full bridge rectifier 32. This event is then recorded by the mains voltage monitoring unit 33. If the mains supply is not restored within predefined time (e.g., an internal timer triggered by the event reaches maximum set value, preferably in the range of 100 milli seconds to 1 second, but other values may be used), the event is determined as a mains outage. If the dependable lamp 10 was in the ON condition previous to the occurrence of the event, a second timer may also triggered. In this case, power for the dependable lamp 10 is supplied from a (battery) backup for a predefined time until the second timer reach a predetermined set value (preferably in the range of 10 minutes to 60 minutes but other values can be used). The second timer may be used to control the amount of time the dependable lamp 10 is on the battery backup. If the lamp was in OFF position, the event can be ignored.

If the mains supply is restored within the predefined time, i.e. the first timer has not reached maximum set value, the mains voltage monitoring unit 33 records this as a second event. In this condition, the mains voltage monitoring unit 33 analyzes a slope of the mains voltage (the mains voltage waveform is typically monitored). Based upon the analysis, it can be determined that the second event is either a voltage dip or intended tactile switch operation. In the event of the intended tactile switch operation, the slope (dv/dt) of mains voltage is higher than during the voltage dip in the mains voltage. In the case of the voltage dip condition, the second event can be ignored. In the case of the intended tactile switch operation, the dependable lamp 10 state is changed (toggled) from ON to OFF or vice versa. This will help avoid false triggering of the dependable lamp 10.

Figure 5:
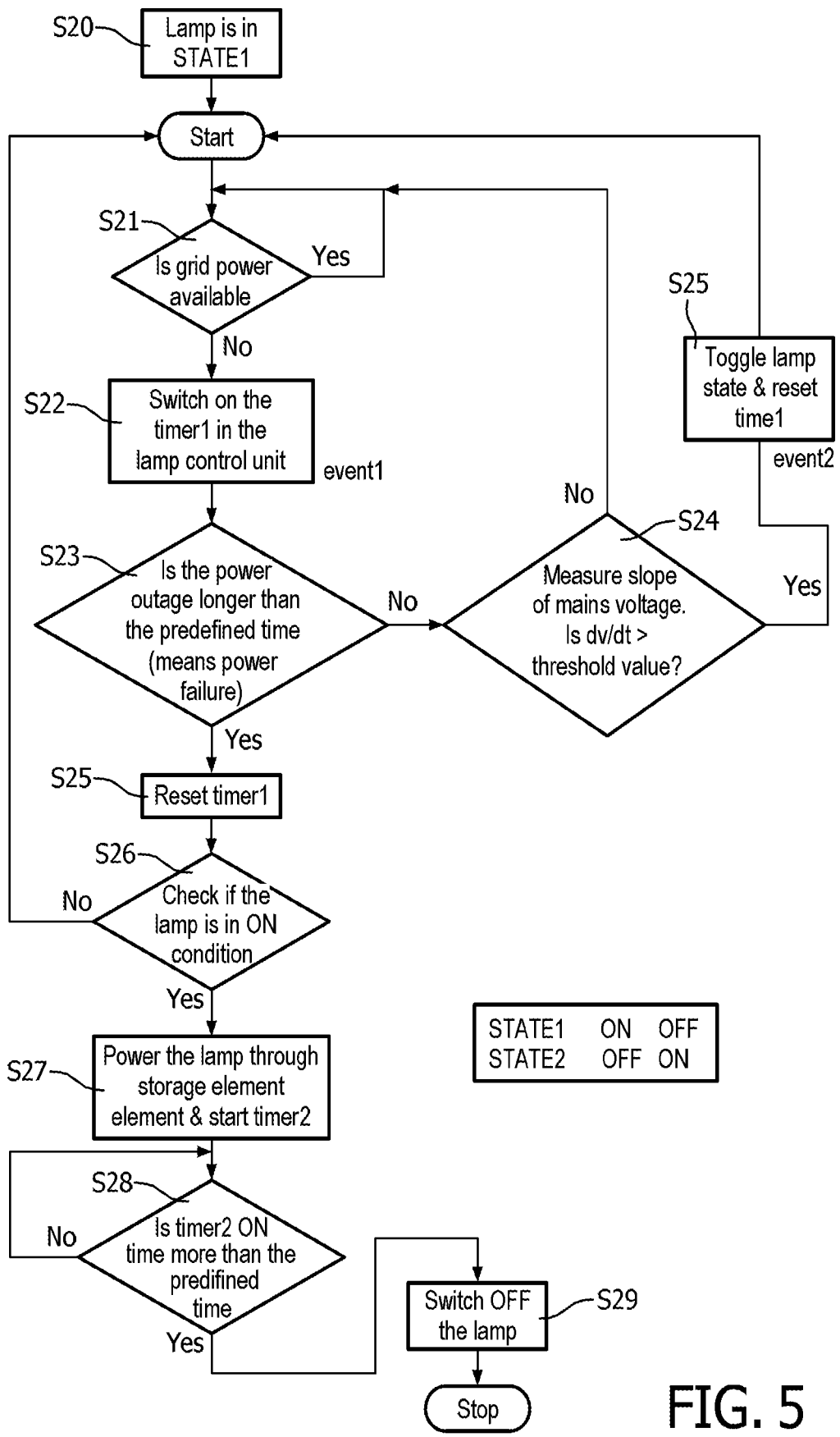
FIG. 5 shows an operational method for a dependable lamp with a tactile switch.

FIG. 5 shows an operational method for a dependable lamp with a tactile switch. As shown in FIG. 5, in step S20, the dependable lamp 10 is initially in STATE1 (i.e., the ON condition). The dependable lamp 10 may be in either the ON or OFF state initially. In step S21, the dependable lamp 10 checks for the availability of the mains/grids power. If the grid power is available, the dependable lamp 10 does not take any action to change state or condition. Otherwise, in step S22, the timer1 is initiated if the loss of grid power is detected. In step S23, it is checked if the mains voltage is restored within the predefined time. If yes then in step S24, is determined if the event is an intended tactile switch operation or a voltage dip in the mains voltage. In the case of the intended tactile switch operation, in step S25, the dependable lamp 10 is switched (toggled) from STATE1 to STATE2 in this example and the timer1 is reset.

If the mains voltage is not restored within the predefined time, the time1 is reset (step S25) and it is checked if the dependable lamp 10 is already in the ON state (step S26). If the dependable lamp 10 is already in the ON state before the power outage then power (step 27) will be provided through a storage element (e.g., battery). The battery backup time is controlled by via timer2 (steps S28 and S29).

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, regard to the various functions performed by the above described components (devices, systems, and the like), the terms (including a reference to a "means") used to describe such components are intended to correspond, unless otherwise indicated to any component, such as hardware or combinations thereof, which performs the specified function of the described component (i.e., that is functionally equivalent), even though not structurally equivalent to the disclosed structure which performs the function in the illustrated implementations of the disclosure.

The principles of the present invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Although a particular feature of the present invention may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

The invention claimed is:

1. A lighting network, comprising:
 a plurality of lamps comprising:
 a first lamp comprising:
  a first direct current (DC) power source configured to provide DC power for the first lamp, and a first controller configured to cause the DC power to be provided to a second lamp when AC power is unavailable from the AC power source; and
 the second lamp connected to the first lamp, the second lamp comprising:
  a second DC power source configured to power the first lamp and the second lamp based at least on the availability of AC power from the AC power source and the availability of the DC power at the first DC power source;
  one or more sensors arranged to detect a presence of a user, and
  a second controller, wherein the second controller is configured to send a request signal requesting DC power from the first lamp based on (i) a signal from the one or more sensors provided before the AC power was unavailable and (ii) a status of the second DC power source.

2. The lighting network of claim 1, wherein the one or more sensors of the second lamp includes a daylight sensor, and the second controller is further configured to bypass requesting the DC power from the first lamp when illumination by day light is detected by the daylight sensor subsequent to the AC power being unavailable.

3. The lighting network of claim 1, wherein the first lamp and the second lamp each includes a bypass switch and an AC/DC converter, and the signal request from the second lamp is configured to cause the AC/DC converters to be bypassed via the bypass switches.

4. The lighting network of claim 1, wherein the first lamp is configured to provide a signal request to the second lamp based on whether the first DC power source has available stored power for the second lamp.

5. The lighting network of claim 1, wherein the first lamp and the second lamp are each configured to record whether a lighting unit of the first lamp or the second lamp, respectively, was on before the AC power was unavailable.

6. The lighting network of claim 1, wherein the first lamp and the second lamp each includes an indicator configured to indicate to a user that a lamp was off at a time when an AC power outage occurred.

7. The lighting network of claim 1, wherein the second controller is configured to bypass providing the request for the DC power from the first lamp when the one or more sensors indicate a room was unoccupied before the AC power was unavailable.

8. A lighting network, comprising:
 a plurality of lamps comprising:
 a first lamp that includes:
  a sensor configured to determine whether a person is located within a room of the first lamp, and
  a first DC power source configured to provide power to one or more lamps of the plurality of lamps when AC power is unavailable from the AC power source, and a second lamp that includes:
a second DC power source, and
one or more controllers in communication with the first lamp, wherein the first lamp is configured to provide a request signal for DC power when:
(i) AC power is unavailable to the plurality of lamps,
(ii) sufficient power is unavailable from the first DC power source, and
(iii) the sensor of the first lamp detected that the room was occupied before the AC power became unavailable, and
wherein the second lamp is configured to provide the DC power from the second DC power source to the first lamp in response to the first lamp providing the request signal.

9. The lighting network of claim 1, wherein the first lamp includes a daylight sensor, and the first lamp is further configured to provide the request for DC power when the daylight sensor of the first lamp indicates that the room was illuminated by natural light before the AC power became unavailable.

10. The lighting network of claim 1, further comprising:
an indicator configured to indicate that a lamp of the plurality of lamps was off at a time when the AC power became unavailable.

11. The lighting network of claim 1, wherein each lamp of the plurality of lamps is configured to initialize a timer in response to detecting unavailability of AC power, wherein each lamp is further configured to determine whether an AC power outage occurred based on a value of the timer.

* * * * *